United States Patent
Prather et al.

(10) Patent No.: US 7,182,349 B2
(45) Date of Patent: Feb. 27, 2007

(54) SHOPPING CART WITH LOWERED CENTER OF GRAVITY AND FRAME THEREFOR

(75) Inventors: James G. Prather, Yorba Linda, CA (US); Patrick Maandag, Corona, CA (US)

(73) Assignee: Mind Wurx, LLC, Yorba Linda, CA (US)

( * ) Notice: Subject to any disclaimer, the term of this patent is extended or adjusted under 35 U.S.C. 154(b) by 3 days.

(21) Appl. No.: 10/622,386

(22) Filed: Jul. 17, 2003

(65) Prior Publication Data

US 2005/0012283 A1    Jan. 20, 2005

(51) Int. Cl.
*B62D 39/00* (2006.01)

(52) U.S. Cl. ............................ 280/33.991; 280/33.997; 280/DIG. 4

(58) Field of Classification Search ........... 280/33.991, 280/33.997, 47.34, 47.35, 47.38, 47.4, DIG. 4
See application file for complete search history.

(56) References Cited

U.S. PATENT DOCUMENTS

| | | | | |
|---|---|---|---|---|
| 2,903,269 A | * | 9/1959 | Hennion | 280/33.995 |
| 4,084,832 A | * | 4/1978 | Upshaw | 280/33.997 |
| 4,097,056 A | * | 6/1978 | Castellano | 280/47.35 |
| 4,335,892 A | * | 6/1982 | Berlin | 280/33.991 |
| 5,401,042 A | * | 3/1995 | Ruger | 280/33.997 |
| 5,435,582 A | * | 7/1995 | Davidson | 280/33.992 |
| 5,507,507 A | * | 4/1996 | Davidson | 280/33.991 |
| 6,406,041 B1 | * | 6/2002 | Rea | 280/33.992 |
| 6,644,674 B2 | * | 11/2003 | Simard | 280/33.991 |

* cited by examiner

*Primary Examiner*—Christopher Ellis
*Assistant Examiner*—Brian Swenson
(74) *Attorney, Agent, or Firm*—Terrell P. Lewis

(57) ABSTRACT

A shopping cart having a lowered center of gravity and including a wheeled base having forward and rear portions, a pedestal formed on the base between the forward and rearward portions for supporting a container or basket thereon, so that the rear of the container is disposed forwardly of the rear of the base. The cart includes an upwardly extensive handle member, and the basket is hung from the handle member at a substantial distance from the upper part of the handle member. The pedestal is supported against excessive longitudinal forces by connecting rods attaching the rear of the pedestal to the handle member. Two horizontal hinge rods are mounted to the handle member, one above the other, with the lower hinge rod pivotably securing the rear pivoting gate of the basket. A child seat on the pivoting gate is disposed in the rear of the basket substantially below the upper end of the handle member.

22 Claims, 3 Drawing Sheets

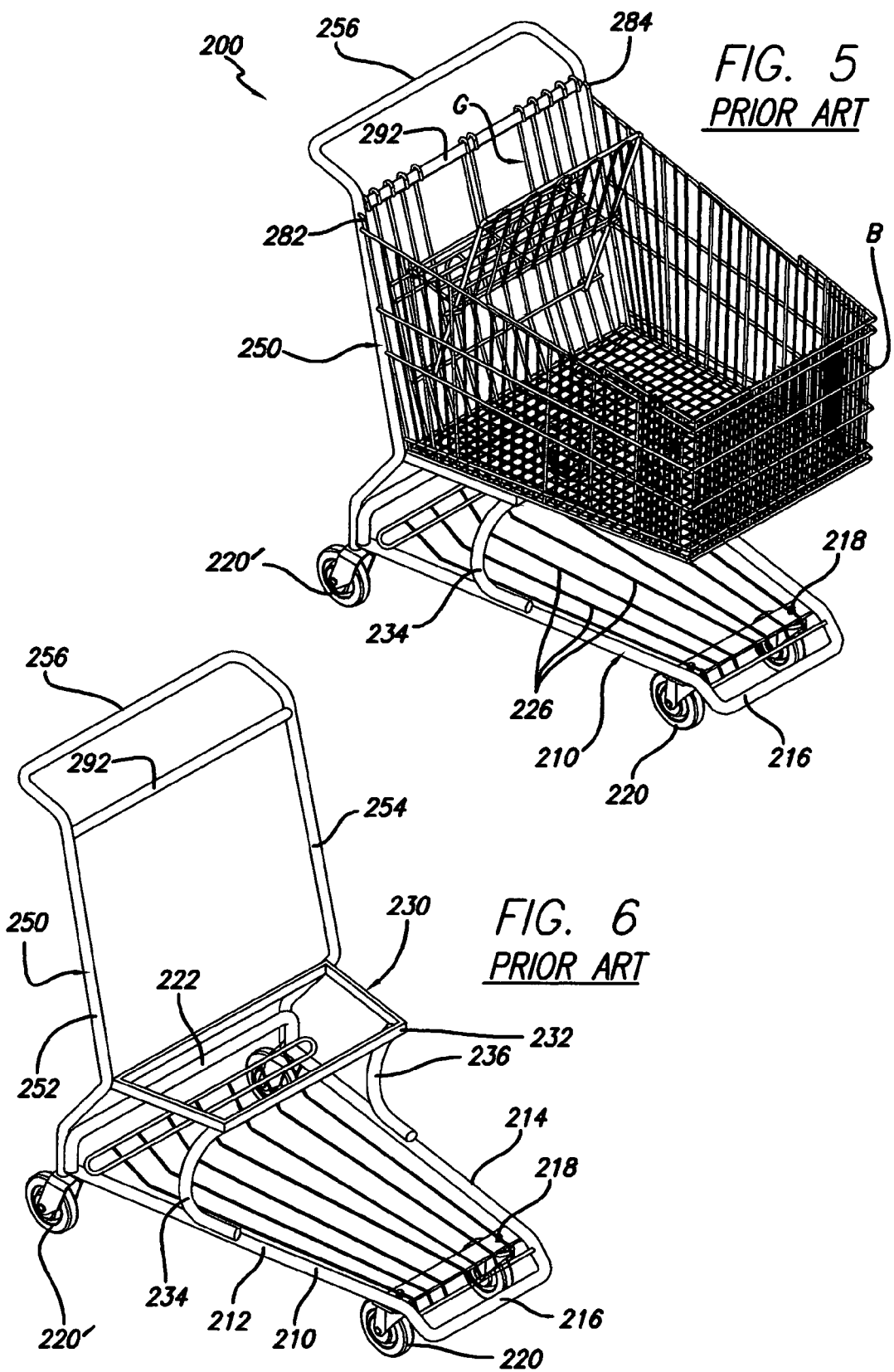

SHOPPING CART WITH LOWERED CENTER OF GRAVITY AND FRAME THEREFOR

FIELD OF THE INVENTION

This invention relates generally to shopping carts of the type generally used in markets, and more particularly to a novel frame for a shopping cart which typically includes a basket or container for carrying goods to be purchased, and more particularly to a frame for a shopping cart that has a rear wheel base which is wider than the wheel base found in conventional shopping carts, and a structure designed for supporting the basket or container of the cart at a location closer to the base of the frame and more forwardly on the base so that the cart is rendered more stable and exhibits a lower center of gravity than the conventional shopping carts.

BACKGROUND OF THE INVENTION

It has been well documented that conventional shopping carts of the kind typically found in supermarkets, department stores or other such stores where consumers select goods from in-store shelving and displays, are contributory in injuries and in some cases deaths of children who are seated or otherwise riding in the carts. For example, in February 1999, the Brain Injury Association of Oklahoma reported that, according to Dr. Gary Smith of Children's Hospital in Columbus, Ohio, the emergency room staff there was attending to 1–2 cases of shopping cart accidents per week. Dr Smith reported that more than half the accidents were due to children standing in the carts while reaching or grabbing for something on a shelf. A 1999 report from the Brain Injury Association of Oklahoma noted that some carts tip over too easily due to their design—if a cart's handle is located too far back from the basket it can create a significant instability, especially with a child in the seat. The tendency for carts to tip over sideways is due to "a narrow wheelbase and a high center of gravity."

Most grocery stores, supermarkets and other large retail outlets provide shopping carts for their customers. Typically, a "conventional" shopping cart (note FIG. 5 and the text below for a more detailed description) includes a support frame supported above the ground by a base that supports caster assemblies. A rack or other package supporting member is generally pivotally supported by forward portion of the base, and a basket is secured to the support frame of the shopping cart by hooks at the upper rear portion of the basket, so that the basket is cantilevered from the support frame.

The handle of the "conventional" shopping cart allows the shopper to stand behind the cart while pushing or pulling, and steering, the cart on the casters. Shopping carts are generally used for transporting goods to be purchased by a shopper walking through and shopping in a market or other retail establishment.

BRIEF DESCRIPTION OF THE DRAWINGS

FIG. 5 shows an example of a "conventional" shopping cart frame and basket assembly; and FIG. 6 is a side view of the "conventional" shopping cart assembly shown in FIG. 5.

DETAILED DESCRIPTION OF THE INVENTION

Figure 1:
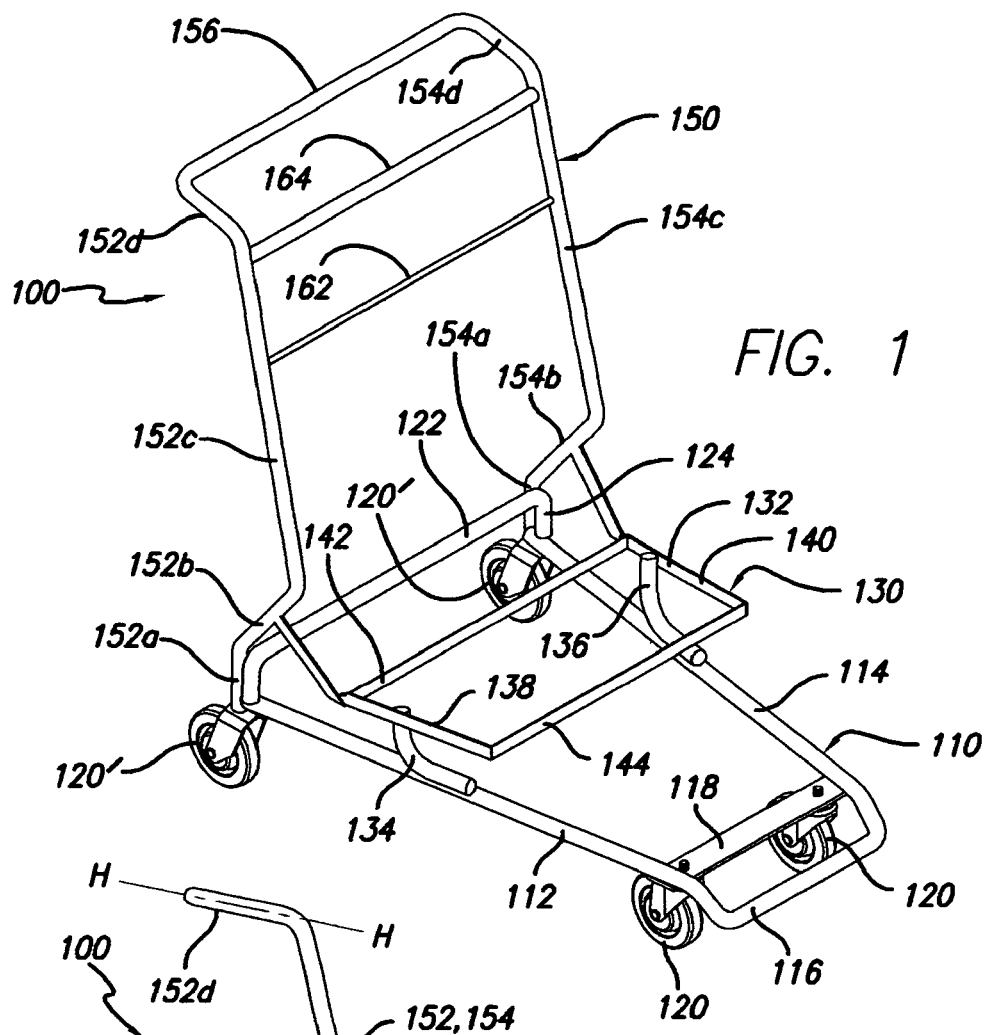
FIG. 1 is a perspective view of the shopping cart frame of the present invention.
Figure 2:
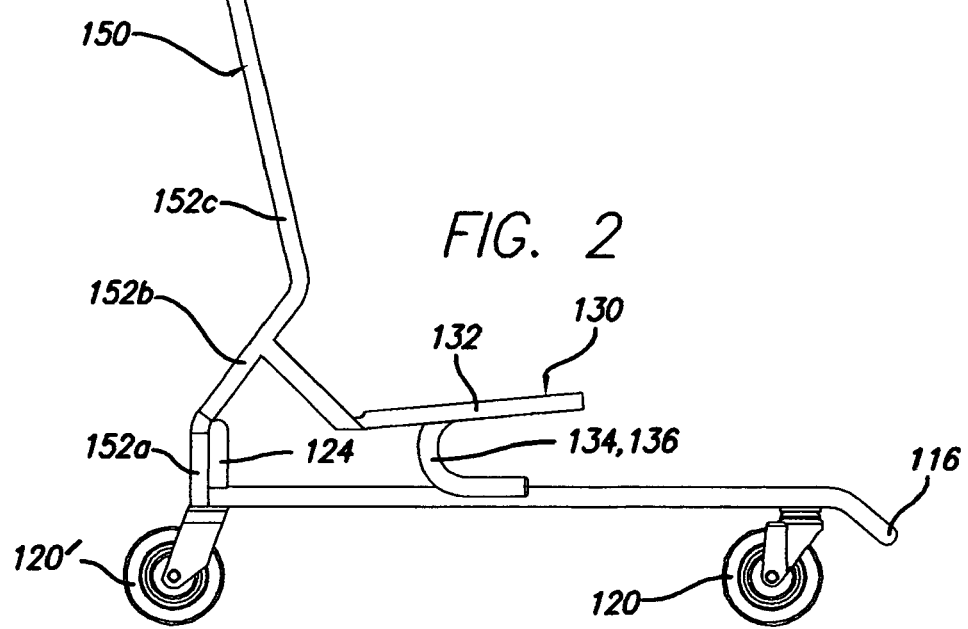
FIG. 2 is a side view of the shopping cart frame shown in FIG. 1.

Referring first to FIGS. 1 and 2, the cart frame 100 according to the present invention is seen to include a base assembly 110, a pedestal assembly 130 on the base assembly, and a handle assembly 150.

The base assembly includes longitudinally disposed elongated side support members 112, 114 running from the rear of the cart frame to the front of the frame which are joined at the front of the cart in a nose member 116. A wheel plate 118, which is mounted to the support members 112, 114 just rearwardly of the nose member 116, supports a pair of wheel assemblies such as casters 120. A second set of casters 120' are mounted to the rear ends of the support members 112, 114, and a cross bar 122 may be provided for connecting the rear ends of the support members 112, 114 at the rear of the base assembly. The cross bar 122 extends laterally between the rear ends of the support members 112, 114, and includes vertical portions 124 connected together by a horizontally extending portion. The invention contemplates that the cross bar 122 will have a length that is greater than the lateral distance between the rear ends of the support members or similar structure on "conventional" shopping carts, thereby rendering the wheel base on the cart of the present invention wider and more stable than the wheel base of "conventional" shopping carts.

Situated on and mounted to the base assembly 110 at a location between the front and rear of the base assembly is a pedestal assembly 130 which includes a platform 132 and a pair of platform support members 134, 136 mounted to the side support members 112, 114. The platform support members maintain the platform at a height spaced from the plane of the base side support members 112, 114 and at a distance sufficient to support the bottom of a basket above, but yet in close proximity to, the upper surface of the base assembly. Preferably, the platform support members 134, 136 are either configured with curvature or some other configuration that affords them some degree of resilience (note for example the U-shaped curvature shown in FIGS. 1 and 2), or they are fabricated from a material that exhibits resilient properties. The fabrication of the platform support members with a shape that exhibits inherent resilience or from a material that offers resilient properties ensures that the platform and the weight it supports will experience a cushioning effect, especially where the loads that the basket carries become increasingly weighty, or where items of large weight might be dropped or placed into the basket as the shopper makes his/her way through the market. The platform 132 comprises a frame structure including a pair of longitudinally extensive frame members 138, 140 each of which are disposed atop a respective side support member 112, 114 of the base, and a pair of laterally extending frame members 142, 144 joined to the longitudinal frame members 138, 140. The frame structure exhibits a rectangular or trapezoidal configuration and defines a plane that is arranged in spaced, nearly parallel, relation to the plane defined by the base of the cart frame. The plane of the platform 132 can also be arranged at a slight inclination to the plane of the base of the cart frame, as, for example, has been shown in FIGS. 2 and 4.

The handle assembly 150 comprises a pair of generally vertical tubular spine members 152, 154 extending upwardly from the rear end of the base support members 112, 114. Preferably, each of the spine members comprises a lower substantially vertical first section 152a, 154a, a second forwardly inclined section 152b, 154b, a third generally vertically oriented section 152c, 154c of length greater than the length of the first or second sections, and a fourth rearwardly angled section 152d, 154d of shorter length than the third section. The uppermost end of the fourth section of one spine is joined to the uppermost end of the other spine's fourth section by a transverse section 156 to form a U-shaped handle portion for the shopping cart frame. In the present invention, the cross member 122 could also be integrally merged into the spines of the handle assembly at or in the vicinity of the intersection between the first and second sections of the handle assembly. Preferably, the U-shaped handle portion defines a nearly horizontal plane (the handle portion can be provided with a slight upward tilt relative to the horizontal as shown in FIG. 2), and the handle portion will extend rearwardly of the shopping cart to allow a user to stand behind the cart to push or pull it.

Figure 4:
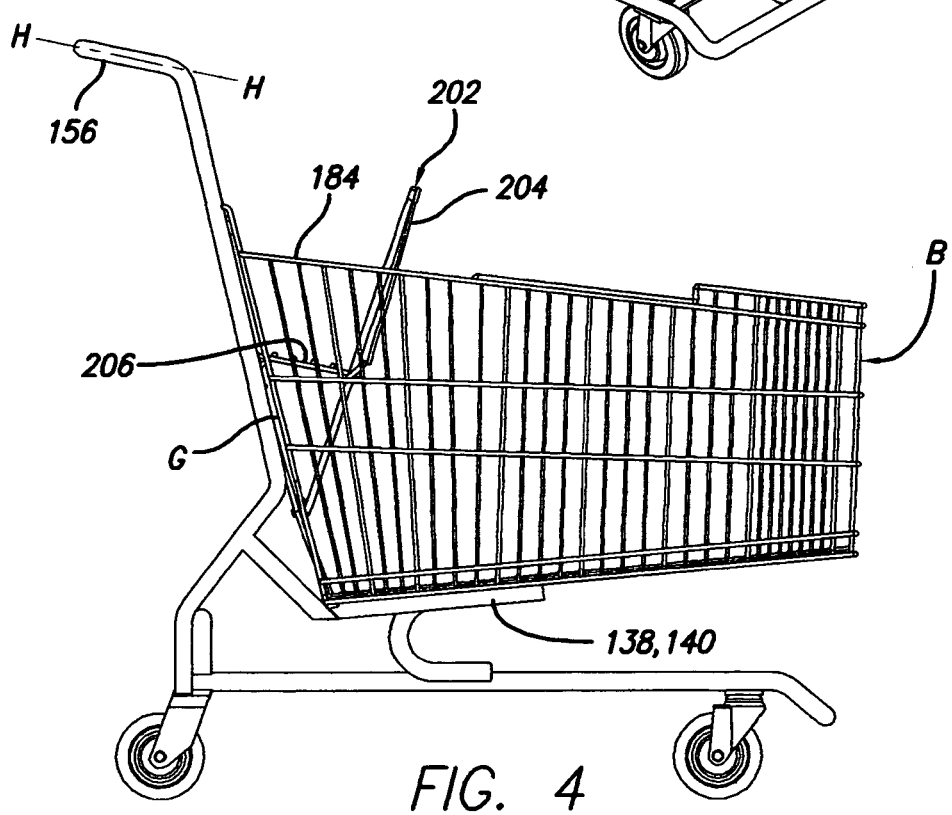
FIG. 4 is a side view of the embodiment of the shopping cart frame and basket assembly shown in FIG. 3.

The basket supporting platform 132 of the pedestal frame structure is positioned at a height, and preferably arranged at an angle relative to the handle spine members 152, 154 so that the rear end of the basket B (see FIG. 4) is seated adjacent the rearmost portion of the longitudinally extending members 138, 140 when the basket B is mounted to the third section 152c, 154c of the vertical spines of the handle. FIG. 4 shows that the plane defined by the platform 132 of the pedestal is not arranged parallel to the plane of the cart frame base, but rather is fashioned with the plane of the platform structure having a slight upward inclination. The handle spine portions and the frame structure of the pedestal form nearly a right angle relative to one another, and together support the rear of the basket forwardly of the rear of the base assembly.

A representative "conventional" shopping cart is shown in FIGS. 5 and 6 The cart 200 includes a base assembly 210, a pedestal assembly 230, and a handle assembly 250. The base assembly includes side support members 212, 214 joined together at the nose of the cart by member 216. A wheel plate 218 is mounted to the support members 212, 214 just rearwardly of the nose member 216, and supports a pair of casters 220, with a second set of casters 220' being mounted to the rear ends of the support members 212, 214. A cross bar 222 extends laterally between the rear ends of the support members. The length of the cross bar 222 is typically a standard fixed length that is shorter than the length of the cross bar 122 of the present invention, as mentioned above and shown in FIGS. 1–4. A basket supporting platform 232 is mounted to the rear of the base assembly, and is supported at its forward end by a pair of platform support members 234, 236 and is supported at its rearward end by a portion of the handle assembly spine members 252, 254. A basket B is suspended on the spine members 252, 254 by hooking wires 282, 284 located at the upper rear of the basket into openings (not shown) formed at a corresponding height on the two spine members. The rear portion of the basket engages, in an abutting manner, the lower portion of the vertical section of the spine members at the lower rear side of the basket, and the rear portion of the basket floor sits on the platform 232.

In the applicants' invention, the basket B is suspended on the spines 152, 154 at a position lower than the suspension location of baskets in the "conventional" shopping carts as depicted in FIGS. 5 and 6. The location of the basket B of the "conventional" shopping cart shown in FIG. 5 is at or immediately below the horizontal transverse member 292, which corresponds in the present invention to the second horizontal transverse member 164 shown in FIGS. 1 and 3. In the present invention, the position of the basket B is at a height equal to or just below the first horizontal transverse member 162, which is located at a substantial distance below the second horizontal transverse member 164.

Further, in "conventional" shopping carts, the rear panel G of the cart basket B (known in the art as the "rear gate") is pivotally mounted to the horizontal transverse member 292 disposed between and attached to the upstanding tubular spines of the handle assembly In the cart of the present invention, it can be seen in FIG. 3 that the rear gate G of the basket B is pivotally mounted on the first horizontal transverse member 162, which is located substantially below the second horizontal transverse member 164 located in the vicinity of the handle portion 156. The second horizontal transverse member 164 is positioned at the same height as the member 292 in the "conventional" cart shown in FIGS. 5 and 6. Thus, in the present invention, the height of the basket, supported on the tubular spines 152, 154 is substantially lower relative to the base 110 than in "conventional" shopping carts thereby resulting in a lowered center of gravity for the shopping cart of the present invention.

Again, in contrast with "conventional" shopping carts, in the present invention, the gate G is pivotally mounted to the first transverse member 162. Moreover, the upper edge 184 of the basket B in the cart of the present invention is located substantially below the plane of the U-shaped handle portion 156 and the second horizontal transverse member 164 (to which the pivoting gate in "conventional" shopping carts is mounted). With reference to FIG. 4, then, it is easy to see that the upper edge 184 of the basket in the present invention is substantially below the plane "H" of the U-shaped handle portion 156.

Disposed between the pedestal 130 and the second section 152b of the tubular vertical spines on opposite sides of the cart base are connecting rods 182, 184 provided for assisting in absorbing stresses applied to the pedestal in longitudinal and transverse directions when goods are placed, dropped or thrown in the basket, as well as for rigidifying the pedestal against downward movement. The connecting rods are mounted to the second section of the spines and extend downwardly and forwardly into engagement with, and secure attachment to, the rear of the pedestal.

Figure 3:
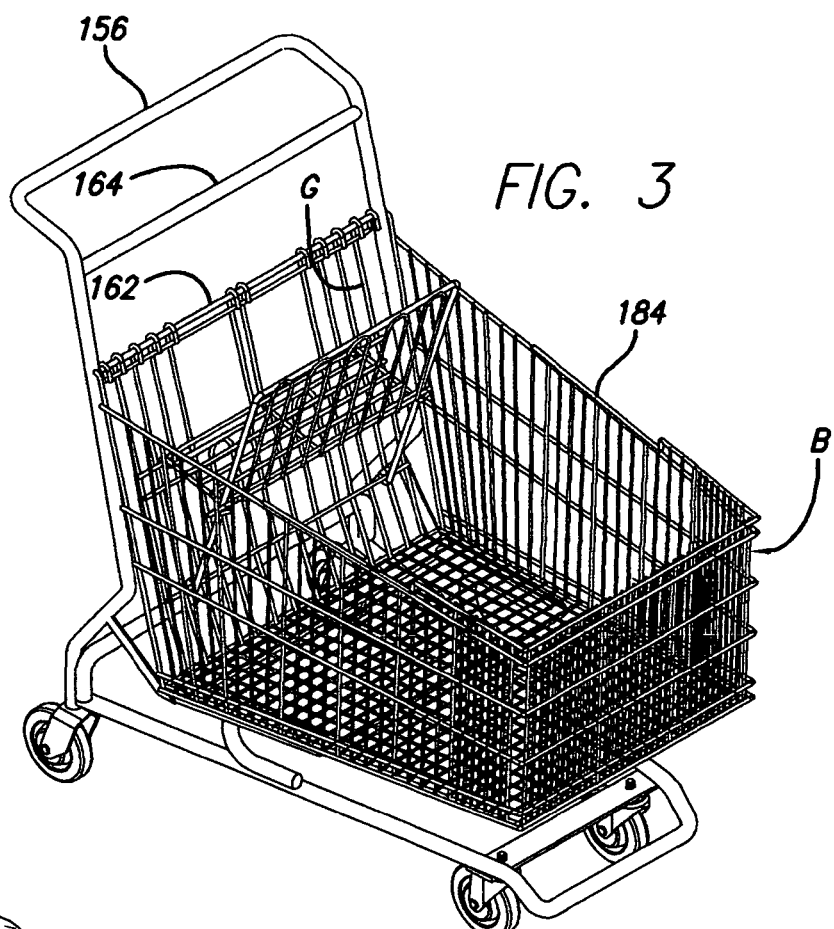
FIG. 3 shows the shopping cart frame of FIG. 1 with a shopping cart basket mounted thereto.

FIG. 3 shows a baby seat 202 in the cart basket B of the present invention that includes a back portion 204 and a seat portion 206. The baby seat 202 is mounted to the cart rear gate G, and is pivotable between a non-functional, collapsed, position in which the back portion 204 of the seat is disposed adjacent the rear gate G of the cart basket and a functional, deployed, position in which the back of the seat is pivoted forwardly. The seat portion 206 extends between the rear gate G and the seat back 204 when the baby seat is disposed in its functional, deployed, position (as shown in FIG. 4). It is important to note that by lowering the basket B on the frame relative to the plane "H" of the handle (FIG. 4), the baby seat 202 has also been lowered relative to the plane "H" of the handle, and the significance of this aspect of the present invention is that this further contributes to the lowering of the center of gravity of the shopping cart.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A shopping cart, comprising:
   a wheeled base having forward and rear portions,
   a container supported by said base, said container comprising a basket,
   a gate member pivotably attached to a handle assembly mounted to said base rearwardly of said container and functionally arranged therewith to act as a closure for the rear of said container, said handle assembly including a handle member extending upwardly from the base.
   a pedestal formed on said base for supporting said container thereon,
      said pedestal being secured to said base at a location between the forward and rearward ends of said base,
   said container being secured on said pedestal at a fixed location so that the lower rear of said container is disposed forwardly of the rear of the base
   wherein said pedestal includes a surface for supporting the rear of the basket forwardly of the rear of the base, and said basket is hung from said handle member at a location disposed a substantial distance from the upper part of said handle member such that said cart possesses a lowered center of gravity.

2. The shopping cart of claim 1, wherein said basket includes front, back, bottom, and side panels, and said pedestal includes a table portion to which the rear portion of the bottom panel of said basket is secured in a stationary position.

3. The shopping cart of claim 2, wherein said table portion of said pedestal is substantially horizontally arranged.

4. The shopping cart of claim 2, wherein said table portion is slightly inclined relative to the base.

5. The shopping cart of claim 4, wherein the back of said table portion is lower than the front of said table portion.

6. The shopping cart of claim 2, wherein said handle member includes a U-shaped handle portion at a top end thereof and a pair of connecting rods for connecting said handle member to said pedestal at the rear of said table portion.

7. The shopping cart of claim 2, wherein the lower region of said handle includes a base attachment member having a forward attachment region and a rearward attachment region, said base attachment member being disposed rearwardly of said table portion.

8. The shopping cart of claim 7, wherein said forward attachment region is secured to the table portion and the rearward attachment region is secured to the rear of said base.

9. The shopping cart of claim 8, wherein said forward attachment region of said handle member is secured to the rear portion of said table portion.

10. The shopping cart of claim 9, wherein said pedestal table portion is supported on resilient elements connected to the base, and the space between said basket and said base is minimized to the extent that its use as storage for merchandise has effectively been eliminated.

11. The shopping cart of claim 1, and further including a pair of vertically spaced apart hinge rods, a first one of said hinge rods being located in the vicinity of the upper end of said handle member and being disposed on said handle member at a first height, and the other of said hinge rods being disposed below said first one of said hinge rods, said lower hinge rod pivotably securing the rear gate of said basket.

12. The shopping cart of claim 1, and further including a child seat at the rear of the basket, said child seat being disposed at a height substantially below the height of the upper end of the handle member.

13. The shopping cart of claim 12, wherein said child seat pivots between a non-functional position in which the rear of the child seat is disposed adjacent the rear gate of the basket and a functional position in which the rear of the child seat is pivoted forwardly into the basket.

14. The shopping cart of claim 1, wherein the width of the rear portion of the wheeled base is substantially greater than the width of the forward portion of the wheeled base.

15. A shopping cart frame, comprising:
    a wheeled base having forward and rear portions,
    a handle member including two horizontally arranged, vertically spaced apart, substantially parallel rods attached to said handle member,
       a pedestal formed on said base for supporting a container thereon, said pedestal being mounted to said base at a location between the forward and rearward ends of said base and at a height relative to said base such that the space between the pedestal and the base is minimized to such an extent that its use as storage for merchandise has effectively been eliminated,
    said pedestal further including surface means for engaging the container and holding it such that the rear of the container is disposed forwardly of the rear of the base, and at a height relative to the base which is substantially lower than the height at which containers in conventional shopping carts are disposed,
    the lower of the two horizontally arranged rods having a gate pivotally attached thereto for closing the rear portion of the container,
    whereby when a container is mounted on the cart frame, the frame and container together possess a lower center of gravity than the center of gravity exhibited by container and frame combinations of other known shopping carts.

16. The shopping cart frame of claim 15, wherein said base includes side rails and casters mounted to the side rails for enabling rolling movement of said base on a horizontal surface, and further including a handle assembly mounted to said base, said handle assembly comprising vertically arranged spine members extending upwardly from said base, said spine members being laterally spaced apart and terminating in a handle defining a handle plane, said spine members including a pair of vertically spaced apart horizontal rod members extending between and connected to the spine members and disposed substantially normal to said spine members, said horizontal rod members being located between said handle plane and said base assembly.

17. The shopping cart frame of claim 16, wherein the upper one of said rod members lies substantially nearly in said handle plane, and the lower one of said rod members is disposed at a height corresponding with, and forming the pivot connection for, the pivoting rear gate of said container.

18. The shopping cart frame of claim 17, wherein said pedestal surface means and the lower one of said rod members are arranged relative to one another such that when said container is disposed on said pedestal surface means, the container and the pivot connection for the rear gate of the container will be located substantially below said handle plane.

19. The shopping cart frame of claim 16, and further including connecting rods projecting from said spine members forwardly and downwardly into securement with the rear of said pedestal for supporting said pedestal against excessive longitudinal forces.

20. The shopping cart frame of claim 16, and further including resilient support elements connected between said pedestal and said side rails of said base for supporting said pedestal against excessive vertical forces.

21. The shopping cart frame of claim 15, wherein the width of the rear portion of the wheeled base is substantially greater than the width of the forward portion of the wheeled base.

22. The shopping cart of claim 15, and further including a horizontal rod mounted at a rear portion of the wheeled base for pivotably supporting a gate member at the rear of the container.

\* \* \* \* \*